United States Patent [19]

Owe et al.

[11] Patent Number: 5,012,369
[45] Date of Patent: Apr. 30, 1991

[54] HEAD SUSPENSION MECHANISM OF A RECORDING APPARATUS WITH A CONSTANT FLYING HEIGHT

[75] Inventors: Takeshi Owe, Kawasaki; Yoshifumi Mizoshita, Tokyo, both of Japan

[73] Assignee: Fujitsu Limited, Kawasaki, Japan

[21] Appl. No.: 353,355

[22] Filed: May 17, 1989

[30] Foreign Application Priority Data

May 18, 1988 [JP] Japan ................................ 63-122808
May 18, 1988 [JP] Japan ................................ 63-122809

[51] Int. Cl.$^5$ ................................................ G11B 5/48
[52] U.S. Cl. ...................................... 360/104; 360/105
[58] Field of Search ......................... 360/103, 104, 109

[56] References Cited

U.S. PATENT DOCUMENTS

| | | |
|---|---|---|
| 4,034,412 | 7/1977 | Smith . |
| 4,625,249 | 11/1986 | Iwata ............................... 360/104 X |
| 4,703,375 | 10/1987 | Chan et al. ....................... 360/105 X |
| 4,777,551 | 10/1988 | Seki et al. ........................ 360/104 X |
| 4,807,070 | 2/1989 | Isozaki et al. .................... 360/104 X |
| 4,901,176 | 2/1990 | Kuzuhara ........................ 360/104 X |

FOREIGN PATENT DOCUMENTS

| | | |
|---|---|---|
| 3540886 | 5/1987 | Fed. Rep. of Germany . |
| 55-142464 | 11/1980 | Japan .................................. 360/104 |
| 61-273783 | 12/1986 | Japan . |
| 63-188856 | 8/1988 | Japan . |

OTHER PUBLICATIONS

IBM Technical Disclosure Bulletin, "Two-Stage Disk File Actuator", vol. 26, No. 2, Jul. 1983, pp. 846-849.

Primary Examiner—A. J. Heinz
Assistant Examiner—Alfonso Garcia
Attorney, Agent, or Firm—Armstrong, Nikaido, Marmelstein, Kubovcik, & Murray

[57] ABSTRACT

A head suspension mechanism of a recording apparatus for flexibly carrying a transducer in a floating state. The mechanism comprises a head slider, a load beam, a spring plate, and an adjusting screw. The load beam is composed of a rigid section, a resilient section, and a holding section. The head slider is suspended at the free end of the rigid section through a gimbal. The load beam is secured to a supporting arm of the head actuator of the apparatus at the holding section, and loaded by the spring plate at the resilient section. The load is easily and precisely adjustable using the adjusting screw. Thus, the head slider contacts the disk at rest with a predetermined static load in order to maintain a favorable flying height of the head slider over the rotating disk. With the above configuration, the load provided by the spring plate is substantially increased as compared with the load to be applied to the head slider, enabling the easy and precise adjusting of the loading force.

15 Claims, 3 Drawing Sheets

HEAD SUSPENSION MECHANISM OF A RECORDING APPARATUS WITH A CONSTANT FLYING HEIGHT

BACKGROUND OF THE INVENTION

1. Field of the Invention:

The present invention relates to a recording apparatus such as a magnetic recording apparatus or an optical recording apparatus, each having airbearing head sliders (hereinafter simply referred to as a head slider). It relates, in particular, to an improvement in the mechanism for suspending the head slider (hereinafter referred to simply as a head suspension mechanism) which is moving over a rotating disk with a constant spacing therebetween, namely, with a constant flying height.

2. Description of the Prior Art:

As is widely known, in a magnetic or an optical recording apparatus, a magnetic or an optical transducer is mounted on an airbearing head slider which is flexibly supported by a suspension mechanism. Such a head suspension mechanism is required to have a rigid structure sufficient to stand the high speed accessing movement of the head slider and an adequate resilient mechanism to maintain a predetermined space between the rotating disk and the head slider flying over the disk.

The head suspension mechanism is secured to a rigid arm of a head actuator (a head positioner) which transfers the head slider in a substantially radial direction of the disk to access a track on the disk. The transducer is an electro-magnetic transducer or an optical head depending on the type of recording apparatus.

In order to make the head slider fly over the surface of a recording medium layer formed on a rotating disk with a predetermined spacing (hereinafter referred to as a flying height), the head slider is mounted on the free end of the head suspension mechanism, usually on the free end of a load beam.

With the above configuration, the head slider is pressed to the associated medium with a static load given by the head suspension mechanism when the disk is at rest. Hereinafter, the static load is referred to as "initial static load". The head slider is statically pressed against the disk when the head suspension mechanism is set in a predetermined position with respect to the medium, usually a medium layer formed on a rotating disk. With this configuration, a resilient section of the head suspension mechanism, namely a load beam, causes a resilient force which is applied to the head slider as an initial static load.

When the disk is rotating at a rotation speed such as 3600 rpm, the head slider flexibly supported by the head suspension mechanism, is subject to an aerodynamic lift force caused by the air flow generated by the rotation of the disk, and it floats over the surface of the disk.

The flying height of the head slider is determined by the balancing between the aerodynamic lift force and the initial static load. The aerodynamic lift force is determined by the surface circumferential speed of the associated medium disk in rotation. Consequently, the initial static load to be applied to the head slider, is approximately determined by the rotation speed and the radius of the disk, and the resilient characteristics of the head suspension mechanism.

The flying height is preferably small to achieve high resolution capability of the transducer, however, it is also preferably large in order to avoid contact of the transducer with the medium. As the recording density on the disk is increased, the flying height has been reduced down to a sub-micron range of less than 0.5 microns.

The setting accuracy of the initial static load depends on the accuracy of the associated mechanism, such as the load beam. Particularly, the resilient section of the load beam in the prior art has usually been subject to a plastic deformation during manufacture through which the section is formed in a curved shape to some degree. Precise operation to make the form in the resilient section is difficult since the load beam is made of spring material such as stainless steel. Inaccurate dimensions of the resilient section causes an undesirable initial static load. As a result, adjustment work to realize and maintain the flying height of the head slider over the disk within a required fluctuation limit, has been a very difficult and delicate matter. This has been an annoying problem requiring an extremely high accuracy in part fabricating work and the precise assembly of the head suspension mechanism. In order to overcome this problem, elaborate and time-consuming work has been inevitable for adjusting the already assembled head suspension mechanism to correct the flying height after assembling the head suspending mechanism.

Watraus, U.S. Pat. No. 4,167,765, discloses a transducer suspension mechanism having the above-described structure. In the side view shown in FIG. 2 of Watraus, a resilient spring section appears to be straight, thus the whole suspension element 10 appears to be flat. However, the resilient spring section 16 must have a form curving downward when the element 10 is considered as one of the parts of the apparatus, otherwise, the initial static load pressure toward the disk 24 can not be provided. Consequently, Watraus can not avoid the above-described problem.

In order to avoid the problem, it has been proposed to provide a variety of pressing members which engage a load beam to provide a pressure to the disk. The feature of these head suspension mechanisms commonly observed in these disclosures, is that the load beam mainly carries a head slider and a pressing member provides an initial static load to the head slider through the load beam. That is, the functions of carrying the head slider and of pressing the head slider, are separated, being individually assigned to different parts, a load beam and a pressing member.

Yamada, Japanese Patent Application No. 62-248178, published Oct. 29, 1987, has proposed an improved transducer suspension mechanism having the above-described feature. The head suspension mechanism of Yamada, as shown in FIG. 1 and FIG. 2 of the disclosure, has an appearance similar to that of Watraus except for a pressing member comprising a supporting arm 31 and a pressing spring 40 which is secured to the free end of the arm 31. The pressing spring 40 directly presses the relevant head slider 50 from the backside thereof through a protuberance 25. The advantage of this configuration lies in that the resilient section 18 is flat and needs not be subject to plastic deformation in order to be formed in a curved or a cylindrical plane, thus being free from the above-described difficulty. However, the load provided by the pressing spring directly applied to the head slider, is required to have the same order of accuracy as that required for the head slider. This still causes an accuracy problem in the formation of the spring 40 and the setting of the pressing member.

Meanwhile, Mizoshita, a co-inventor of the present invention, has also disclosed another improved transducer suspension mechanism in Unexamined Japanese Patent Application No. 61-273783, published Dec. 4, 1986. As shown in FIG. 1 and FIG. 2 of the disclosure, an auxiliary spring 21 having a frictional protuberance 22 is disposed to press a rigid section of a load beam through the protuberance 22. A resilient section 2 of the load beam is formed to have a curved plane as that of Watraus, and pressure imposed on a head slider 4 is the resultant of pressures caused by the resilient portion 2 and the spring 21. The most favorable advantage of Mizoshita is a damping function to the mechanical oscillation which is caused by quick stop and start movements of the head slider under accessing operation. According to the disclosure, mechanical vibration of the load beam is damped by the friction between the surface of the rigid section of the load beam and the frictional protuberance 22 both of which are moving in a mutual rubbing motion.

Because of the severe requirement for the pressure loaded on a head slider, an adjustment means for the load is desirable. The adjusting means is found, for example, in Unexamined Japanese Patent Application No. 63-188856, published on Aug. 4, 1988, invented by Kuzuhara. However, the disclosure relates to a head suspension mechanism of a magnetic head recording apparatus employing floppy disks, wherein magnetic heads are not of the floating type, often being in contact with surfaces of the floppy disks. Magnetic heads, as shown in FIG. 1 of the disclosure, are pressed against a floppy disk 24 through a gimbal plate 12, spring plate 16, and an adjusting spring 17 the pressure of which is adjusted by an adjusting screw 20.

SUMMARY OF THE INVENTION

The primary object of the present invention is to provide a head suspension mechanism by which the correct flying height of a head slider mounted thereon can be easily and precisely provided.

Another object of the present invention is to provide a head suspension mechanism whose parts can be accurately fabricated, and in which assembling is easy for accurately providing the head slider with a predetermined static load.

The above objects can be achieved by a head suspension mechanism comprising a load beam and a pressing member which engages with the load beam. The load beam comprises a rigid section, a resilient section, and a holding section, connected to each other in the recited order, and produced in a one piece body. The rigid section is reinforced by turned-up flanges formed at both sides thereof. The resilient section is flat and not subject to any mechanical deformation work during the fabrication process thereof. The holding section is secured to a rigid arm of the head actuator for accessing the head slider to different tracks on the relevant medium. The whole load beam is held in a cantilever manner which is secured at the holding section and is free at the opposite end where the head slider is attached.

The head suspension mechanism further has a pressing member. Although the load beam holds the head slider at its free end, the load beam does not provide the head slider with pressure by itself, since the resilient section is originally made flat. Instead, the pressing member loads the head slider with a static pressure directed toward the medium by pressing the load beam at a position locating in the resilient section, whereby the rigid section of the load beam is inclined toward the medium, and the resilient section is elastically deformed.

The feature of the present invention lies in the position at which the pressing member presses the load beam. The position is selected to be as far as possible from the head slider. With this configuration, the loading force of the pressing member is increased because the predetermined initial static pressure at the head slider is magnified due to the lever action principle. The increase in the loading force of the pressing member provides for easier adjustment of the force in comparison with having a lower loading force. The pressing member is made of resilient material and the loading force is provided by pressing or deforming the pressing member such that the head slider of the load beam is pressed towards the medium by adjustably feeding a screw. Thereby, the loading force of the pressing member can be precisely and easily adjusted, improving the capability of the head suspension mechanism for adjusting the initial static load. As the result, the flying height of the head slider flying over the rotating disk is maintained at a predetermined height with enhanced accuracy and reliability.

The head suspension mechanism further may have a tongue section which is formed in a portion of the resilient section of the load beam and extends in the longitudinal direction of the load beam. The pressing member presses the tongue section with its free end toward the recording disk side or the opposite side. The force of the pressing member is adjusted by an adjusting means, usually a screw.

The features and advantages of the present invention will be apparent by the reading of the following description and claims with reference to the following drawings in which like reference numerals denote like parts.

DETAILED DESCRIPTION OF THE PREFERRED EMBODIMENTS

A first embodiment of the present invention is described in detail with reference to the drawings.

Figure 1:
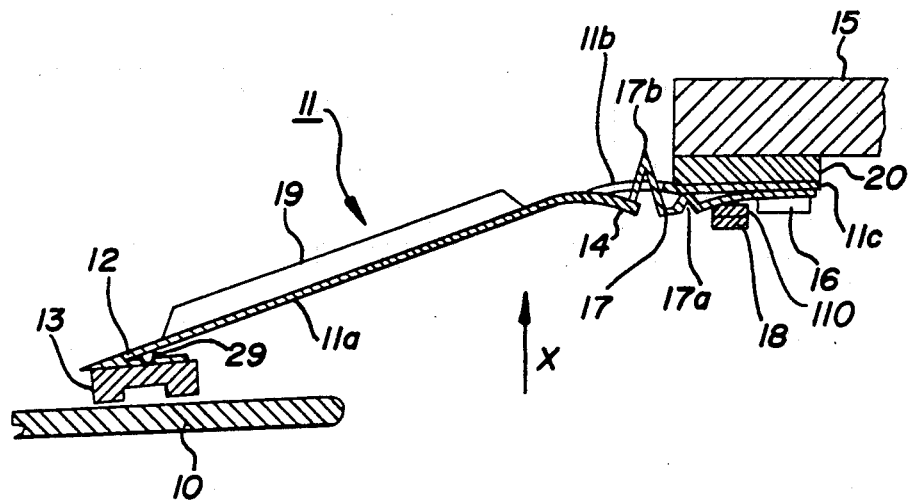
FIG. 1 is a schematic cross-section of a head suspension mechanism according to the present invention.
Figure 2:
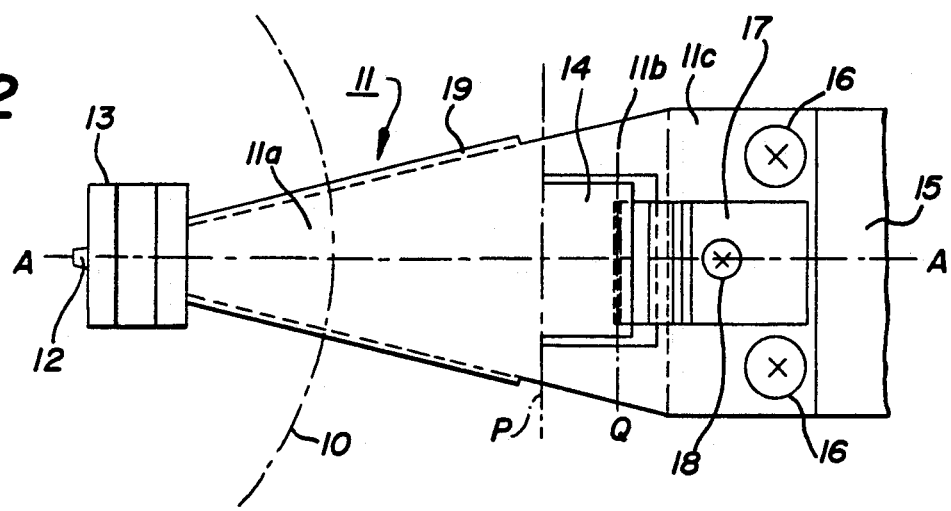
FIG. 2 is a schematic plan view of the head suspension mechanism of FIG. 1 seen from the side of the medium disk.

FIG. 1 is a schematic cross-sectional view of a head suspension mechanism according to the present invention, and FIG. 2 is a plan view of the head suspension mechanism of FIG. 1 seen from the side of the medium disk, namely in a direction indicated by an arrow X shown in FIG. 1.

The head suspension mechanism of the first embodiment is described with reference to these drawings. The head suspension mechanism has a substantially symmetric form along a symmetry axis A shown by a chain line in FIG. 2. The head suspension mechanism comprises, a head slider 13, and a substantially resilient load beam 11. The load beam 11 suspends a head slider 13 at its free end, and is secured to a rigid supporting arm 15 of a head actuator assembly (not shown) through a spacer 20 using screws 16 at the other end. The head slider 13 contains an electromagnetic transducer, and is suspended at the apex of the load beam 11 through a gimbal 12 which holds the head slider 13 so that it is flexibly movable. The initial static load is applied to the head slider 13 through a protuberance 29 to direct the load to the center of gravity of the head slider 13 or a point near the center of gravity. The structure of the gimbal 12 and the head slider 13 are conventional, hence further description of the structure is omitted.

Figure 3A:
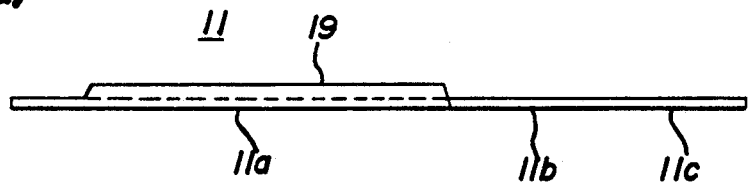
FIGS. 3(a) and 3(b) are views showing a head suspension mechanism of a magnetic disk apparatus.
Figure 3B:
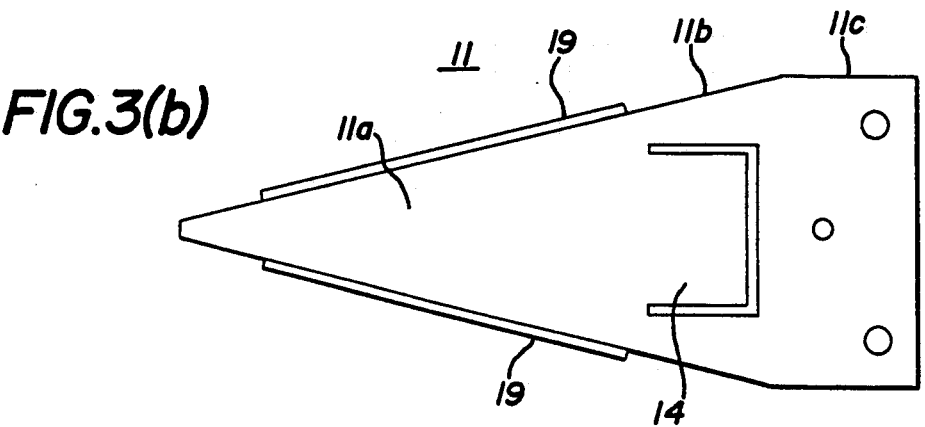

The load beam 11 comprises a rigid section 11a having a substantially triangular shape and is reinforced by turned-up side flanges 19 formed along both sides thereof, a resilient section 11b, and a holding section 11c. The rigid section 11a, resilient section 11b, and holding section 11c are continuous to each other and are formed in a single body piece by punching and pressing a resilient metal plate such as a resilient stainless steel plate. The load beam 11 as one of parts of the head suspension mechanism is illustrated in a side view of FIG. 3(a) and a plan view of FIG. 3(b). The resilient section 11b of the load beam 11, as shown in FIG. 3(a), is flat and not subject to any mechanism stress which produces plastic deformation to provide the resilient section 11b with a curved form through the fabrication or manufacturing thereof. This means that the problem regarding the accuracy of the dimensions of the load beam in the prior art head suspension mechanism, is completely avoided. As a result, the resilient section 11b alone does not provide any resilient force to the head slider 13, until the resilient section 11b is flexibly deformed by the pressing member 17. Thus, the head slider 13 is loaded toward the associated disk 10 with an initial static load. That is, the initial static load is generated by a pressing member 17 which is described below. The load beam 11 is secured to the rigid supporting arm 15 at the holding section 11c with screws 16, and consequently the holding section 11c is kept rigid and is not subject to deformation.

In the center portion of the resilient section 11b, as shown in FIG. 1 and FIG. 2, a tongue section 14 is formed by cutting a U-shaped slit extending along the symmetrical axis A of the head suspension mechanism. The root of turning-up of the tongue section 14 (bend line) is shown by a chain line P. The root line P is perpendicular to the symmetrical axis A.

The head suspension mechanism of the first embodiment is energized by a pressing member 17. One end of the pressing member 17 is secured to a portion of the supporting member 15 together with the holding section 11c of the load beam 11 with the screws 16. An adjusting screw 18 is set in the rigid supporting member 15 in the area of the screws 16, penetrating through the pressing member 17. The adjusting screw 18 may include a locking resilient member 110 for setting the screw. The head of the adjusting screw 18 engages the surface of the pressing member 17 in order to selectively press and deform the pressing member 17 which is made from thin stainless plates. The pressing member 17 is also formed in a multi-folded form folded in a direction perpendicular to the symmetrical axis A, having a hair pin like longitudinal cross-section. As shown in FIG. 1, the pressing member 17 has two bent portions, creases 17a and 17b. The first crease 17a is in contact with the back surface of the holding section 11c of the beam load 11. When the adjusting screw is fed forward, then the pressing member 17 is deformed by being pressed by the screw head of the screw 18 towards the supporting member 15, and the front portion of the pressing member including the second crease 17b is slightly rotated around the first crease 17a. Thereby, the free end of the pressing member 17 is lowered as the adjusting screw 18 is fed forward, to bring the free end of the pressing member 17 in line contact with the tongue section 14 at a line Q indicated by a chain line and press the top end portion of the tongue section 14 toward the disk 10. The load applied to the tongue section 14 is adjusted by adjusting the deformation of the pressing member 17. Thus, the initial static load of the head slider 13 is achieved by an appropriate feed distance of the screw 18.

With the above-described configuration, by feeding forward the screw 18, the tongue section 14 of the load beam 11 is pressed toward the medium disk 10 by the free end of the pressing member 17 which is in contact with the tongue section 14 at the top end portion thereof. Consequently, the tongue section 14 is deflected toward the disk 10, and simultaneously the resilient section 11b is forced to be elastically deformed in a curve to the disk 10. Thereby, the load of the load beam 11 is loaded on the head slider 13 to press the head slider 13 to the disk 10 at rest, presenting an initial static load. The initial static load is easily adjusted by adjusting the feed distance of the adjusting screw 18. In addition, the adjustment can be performed even when the disk 10 is rotating. Thus, by adjusting the initial static load applied to the disk 10, an appropriate flying height of the head slider 13 over the disk 10 is easily and steadily maintained.

There is another aspect of the advantage of the tongue section 14. Generally, in a head suspension mechanism, the head slider 13 moves up and down following the repeated upward and downward movements of the rotating disk 10 with which the head slider 13 is engaging. In addition, access movements of the relevant head actuator generate a considerable vibration adversely affecting the head slider 13. These cause minute mechanical vibration of the load beam 11. By introducing the structure of resilient tongue section 14, the effect of such a vibration is reduced. Furthermore, the rigidity against a torsion effect and bending effect caused by quick accessing movement, mostly repeated stop and start movements, is enhanced by the structure of the head suspension mechanism of the first embodiment, because the tongue section 14 is pressed toward the disk 10 with a line contact extending along the line Q which is perpendicular to the symmetrical axis A.

FIGS. 4(a) to 4(d) are extremely schematic side views of the load beam, illustrating the deflection of the load beam 11 at various fabricating stages of the head-disk assembly of the recording apparatus.

Figure 4A:
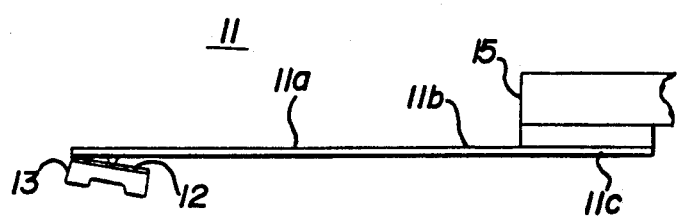
FIGS. 4(a) to 4(d) are extremely schematic side views of the load beam, illustrating the deflection of the load beam at various fabricating stages of the head-disk assembly of the recording apparatus.

FIG. 4(a) is the side view of the load beam just after the parts fabrication stage. The resilient section 11b is flat, being subjected to no plastic deformation.

Figure 4B:
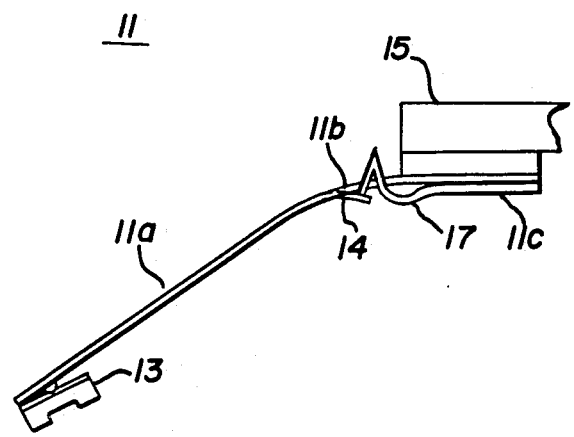

FIG. 4(b) shows the load beam at a stage after the assembly of the head suspension mechanism. The pressing member 17 presses the tongue section 14 of the load beam 11 on the line Q, and the resilient section 11b is flexibly deflected downward. The head slider 13 is free.

Figure 4C:
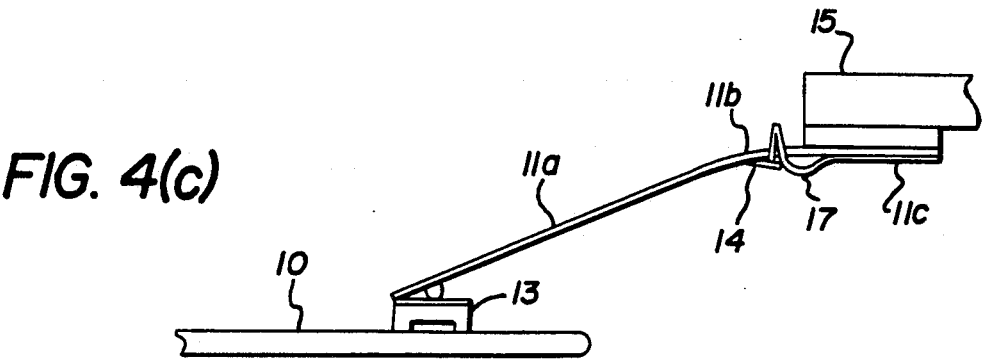

FIG. 4(c) shows a stage where the head suspension mechanism is engaging with the disk 10 which is at rest. The head slider 13 is in contact with the disk 10. The head slider 13 is positioned higher than the preceding stage of FIG. 4(b), and the tongue section 14 is further deflected downward and makes the load beam 11 present the initial static load at its apex toward the disk 10 through the head slider 13.

Figure 4D:
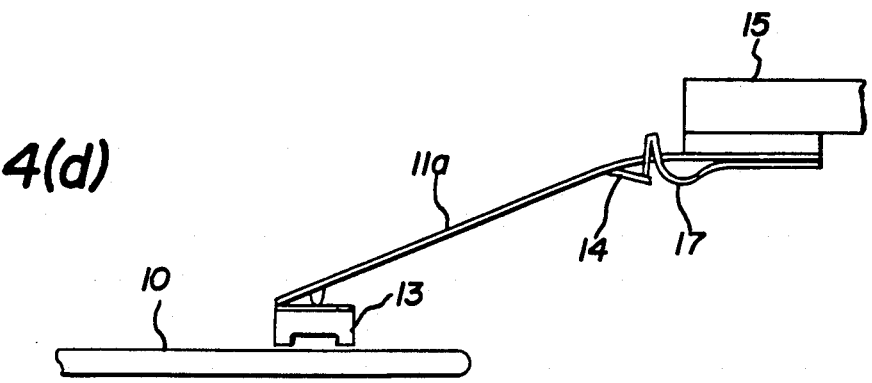

FIG. 4(d) represents the load beam 11 at a stage where the disk 10 is rotating. Aerodynamic lift given by air flow caused by the rotation of the disk 10 lifts the head slider 13 over the disk 10 spaced from each other by a gap, namely, the predetermined flying height.

A second embodiment of the present invention is now described. The second embodiment is provided following the same technical principle as that of the first embodiment except for the pressing member.

Figure 5:
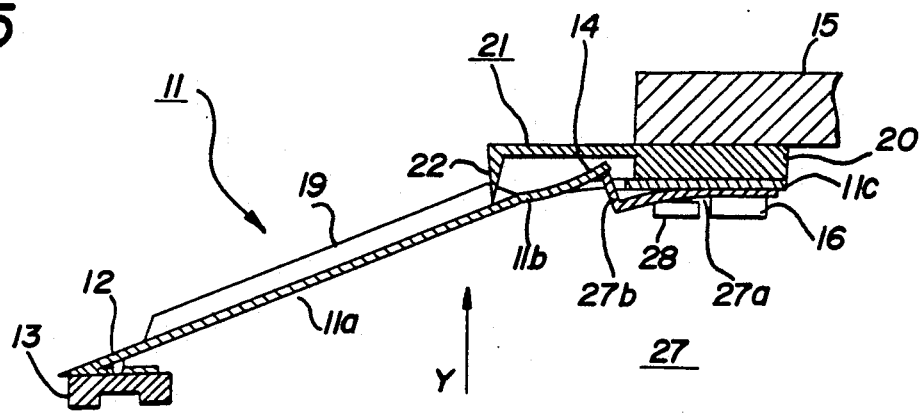
FIG. 5 is a schematic cross-sectional view of a head suspension mechanism of a second embodiment.
Figure 6:
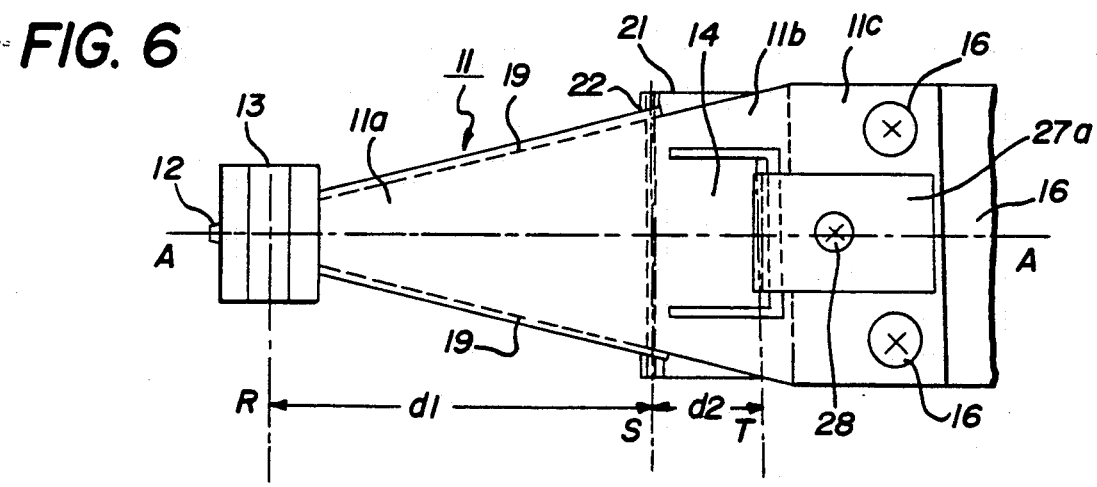
FIG. 6 is a plan view of the head suspension mechanism of FIG. 5 seen from the side of the medium disk.

FIG. 5 is a schematic cross-sectional view of a head suspension mechanism of a second embodiment of the present invention in the associated head-disk assembly, and FIG. 6 is a plan view of the head suspension mechanism of FIG. 5 seen from the side of the medium, namely in a direction indicated by an arrow Y shown in FIG. 5.

The structures of a load beam 11 including a rigid section 11a, a resilient section 11b, and a holding section 11c, a gimbal 12, a head slider 13, a tongue section 14, a supporting arm 15 of the head actuator (not shown), fixing screws 16, and a spacer 20 are the same of those of the first embodiment. In the second embodiment, as shown in FIG. 5, a fulcrum supporting member 21 is formed integrally with the spacer 20 at one end thereof, having a cross-section of a hook-like shape which is provided by a projected portion 22 directed towards the disk 10. On the top end of the projected portion, a fulcrum edge having the form of a knife edge, pivotally supports the load beam 11 at a line S (shown by a chain line) on the surface of the load beam 11 from the side opposite to the disk 10. The line S is perpendicular to the symmetrical axis A and located in the vicinity of a boundary line at which the resilient section 11a and the resilient section 11b are adjacent to each other. Of course, the spacer 20 and the fulcrum member 21 may be formed separately.

A pressing member 27 is made from resilient metal plate, such as resilient stainless steel plate, and has a hook-like shaped side cross-section comprising a major part 27a and projecting part 27b turned-up from the major part 27a. The pressing member 27 is secured to the rigid arm 15 of the head actuator together with the holding section 11c of the load beam 11 with screws 16 at the rear portion of the major part 27a. The edge of the projecting part 27b which is disposed at the front portion of the pressing member 27, is directed away from the disk 10, contacting at the free end of the tongue section 14 at a line T, as indicated by a chain line in FIG. 6. The pressing member 27 provides the tongue section 14 with a load in a direction opposite to the disk 10 by feeding an adjusting screw 28 forward. The screw 28 corresponds to the screw 18 of the first embodiment and is set in the supporting member 15 in a similar manner. As the result, in the head-disk assembly, the front portion of the major part 27a of the pressing member 27 is flexibly deflected such that the projecting part 27b extends in a direction away from the disk 10, applying a loading force Fa on a portion of the tongue section 14 near the free end of the section 14 along the line T. Since the load beam 11 is pivotally supported at the fulcrum edge, the loading force Fa is minimized to a loading force Fb which is applied to the head slider 13 by a lever action of the load beam 11. The loading force Fb is applied to the head slider 13 through a protuberance 29, and finally applied onto the disk 10 as the initial static load. The distances from the line S to the protuberance 29 or the line T are $d_2$ and $d_1$ respectively, where:

$$Fa = d_1/d_2 \cdot Fb$$

In a ordinary structure of the head suspension mechanism of the second embodiment, $d_1/d_2$ is much larger than 1, hence, a change of Fa causes a minute change of Fb. This means, minor change of the initial static load presented to the head slider 13 can be adjusted by changing the loading force of the pressing member 27 in a magnified relation, namely by $d_1/d_2$ times, leading to an easier and more accurate adjustment of the initial static load of the head slider 13 than the adjustment in the head suspension mechanism of prior art described above, such as that of Yamada.

Figure 7:
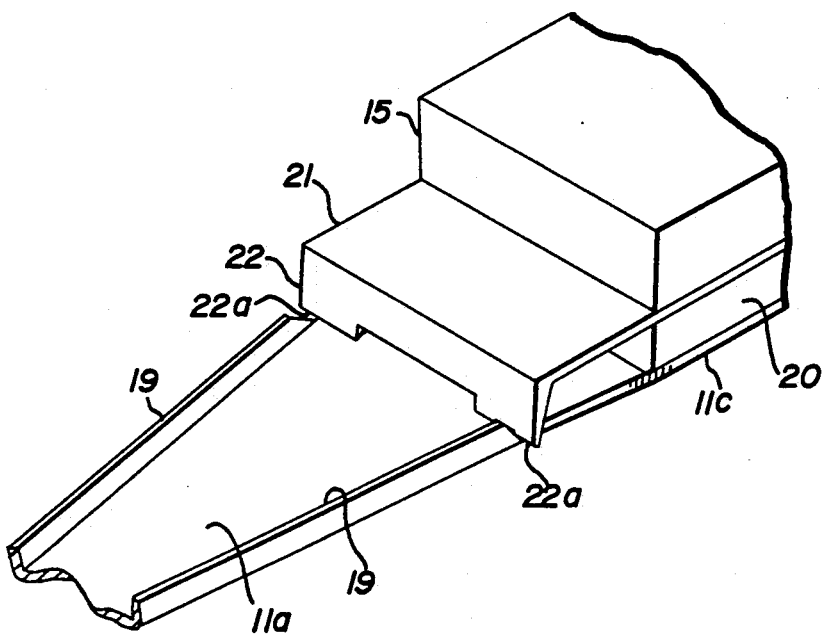
FIG. 7 is a perspective view of a fulcrum edge having two protruded portions disposed at both side ends.

The edge of the fulcrum supporting member 21 may be further modified as shown in a partial perspective view of FIG. 7. The edge of the straight line can be replaced by an edge comprising two protruding portions 22a disposed at both side ends as shown in a perspective view of FIG. 7. The two end protuberance edge structures apparently enhances the contact stability between the fulcrum supporting member 21 and the surface of the load beam 11.

Enhancement of the rigidity of the head suspension mechanism of the second embodiment is basically similar to that of the first embodiment, however, against a torsional force subjected to the head suspension mechanism, the second embodiment is more rigid than the first embodiment.

As can be clearly understood by the above description, in a head suspension mechanism of a head slider according to the present invention, the initial static load presented by a load beam can be changed easily by adjusting feed of a screw which adjustably presses a pressing member. As a result, the flying height of the head slider over the associated disk can be maintained at a predetermined height.

In the above-described embodiments, the present invention is applied to a magnetic recording apparatus, but the present invention is also applicable to a head suspension mechanism for a flying head slider of an optical recording apparatus.

The many features and advantages of the present invention are apparent from the detailed specification and thus, it is intended by the appended claims to cover all such features and advantages of the mechanism which fall within the true spirit and scope of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What we claim are:

1. A head suspension mechanism for connection with a rigid supporting arm of a head actuator, said head suspension supporting a transducer for operational coupling with a recording medium disposed on a rotatable disk in a recording apparatus, said head suspension mechanism comprising:

a head slider for supporting said transducer in a flying state of the disk when said disk is rotating;

a load beam of resilient material comprising a rigid section, a resilient section, and a holding section, serially positioned adjacent to one another;

said rigid section having a gimbal and suspending said head slider at a free end thereof through said gimbal;

said resilient section permitting movement of said head slider in a direction perpendicular to said disk, said resilient section having a tongue section formed therein;

a pressing means of resilient material having a loading end positioned at one end thereof, and a securing portion at another end thereof, said securing portion secured to said rigid supporting arm, wherein the loading end of said pressing means contacts said tongue section near a free end of said tongue section; and an adjusting means for adjustably deforming said pressing means, wherein said resilient section of said load beam is elastically deformed to include said rigid section toward said disk with said head slider in contact with said disk, at rest, at a predetermined static pressure.

2. A head suspension mechanism of claim 1, wherein said resilient section of said load beam is flat when said resilient section is free from any working force.

3. A head suspension mechanism of claim 1, wherein said tongue section, formed in said resilient section of said load beam, extends in a direction of a longitudinal axis of said load beam and has the free end directed towards said holding section.

4. A head suspension mechanism of claim 1, wherein said pressuring means is a folded plate spring having a plurality of folding creases formed in a direction perpendicular to a longitudinal axis of said load beam, wherein a pressing end of said folded plate spring is moved toward said disk when said folded plate spring is deformed by adjusting said adjusting means towards said folded plate spring.

5. A head suspension mechanism of claim 1, wherein said pressing means is a stainless spring plate having a uniform thickness.

6. A head suspension mechanism of claim 1, wherein said loading end of said pressing means is formed perpendicular to a longitudinal axis of said load beam such that said loading end contacts with said tongue section in a line contact.

7. A head suspension mechanism of claim 1, wherein said adjusting means is a screw for engagement in a portion of said rigid supporting member, penetrating through said pressing member such that said pressing member is deformed by adjusting said screw.

8. A head suspension mechanism of claim 7, wherein said adjusting means further including a locking resilient member for setting said screw.

9. A head suspension mechanism of claim 1, wherein said holding section and said securing portion are stacked so as to be secured to said rigid supporting arm by a screw.

10. A head suspension mechanism of claim 1, further comprising a fulcrum supporting means secured to said rigid supporting member at one end thereof, said fulcrum supporting means having a fulcrum edge at another end thereof, said fulcrum edge contacting said load beam at a portion on a borderline of said rigid section and said resilient section or at a portion of said rigid section adjacent to said borderline on a side opposite to said disk, wherein said load beam is pivotally supported on said fulcrum edge.

11. A head suspension mechanism of claim 10, wherein said pressing means is a folded plate spring, being deformable such that the loading end of said pressing means is moved away from said disk when said pressing means is deformed by adjusting said adjusting means forward wherein said load beam is pivotally rotated around said fulcrum edge such that said head slider is loaded towards said disk.

12. A head suspension mechanism of claim 10, wherein said fulcrum edge of said fulcrum means has a plurality of projecting portions formed such that said fulcrum edge contacts with said load beam at said projected portions in a multi-point contact.

13. A head suspension mechanism for flexibly carrying a transducer over a rotating disk, said head suspension mechanism secured to a rigid supporting arm of a head actuator of a recording apparatus, said head suspension mechanism comprising:

a head slider having said transducer attached thereto;

a load beam of resilient material comprising a rigid section, a resilient section, and a holding section, said rigid section suspending said head slider at a free end thereof, said resilient section having a tongue section therein, and said holding section being secured to said rigid supporting arm to support said load beam; and a pressing means of resilient material having a loading means at one end thereof, and said pressing means secured to said rigid supporting arm at another end thereof, said loading means in contact with a portion of said tongue section, wherein said head slider loads said disk, at rest, with a predetermined static load.

14. A head suspension mechanism for flexibly carrying a transducer over a rotating disk, said head suspension mechanism being secured to a rigid supporting arm of a head actuator of a recording apparatus, said head suspension mechanism comprising:

a head slider having said transducer attached thereto;

a load beam of resilient material comprising a rigid section, a resilient section, and a holding section, said rigid section suspending said head slider at a free end thereof and, said holding section being secured to said rigid supporting arm to support said load beam, said resilient section located between said rigid section and said holding section; and a pressing means of resilient material having a loading end, said pressing means secured to said rigid supporting arm, and said loading end in contact with a portion of said resilient section, wherein said head slider contacts said disk, at rest, with a predetermined static load.

15. A head suspension mechanism of claim 14, further comprising:

an adjusting means contacting said pressing means, for adjustably deforming said pressing means to position said head slider to contact said disk, at rest, with a predetermined static load.

* * * * *